Dec. 26, 1967  B. R. WALSH  3,359,795
WIND VELOCITY INSTRUMENT
Filed April 29, 1965  2 Sheets-Sheet 1

INVENTOR.
BRUCE R. WALSH

Dec. 26, 1967  B. R. WALSH  3,359,795
WIND VELOCITY INSTRUMENT
Filed April 29, 1965  2 Sheets-Sheet 2
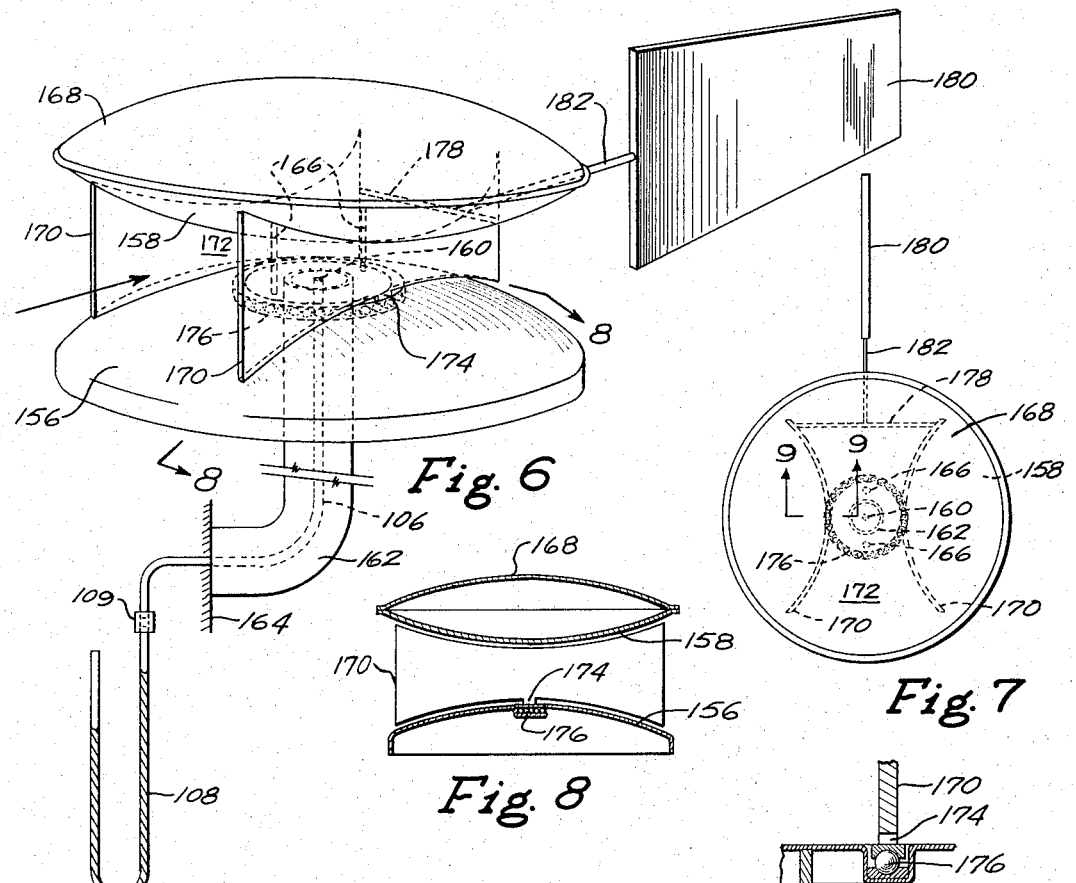
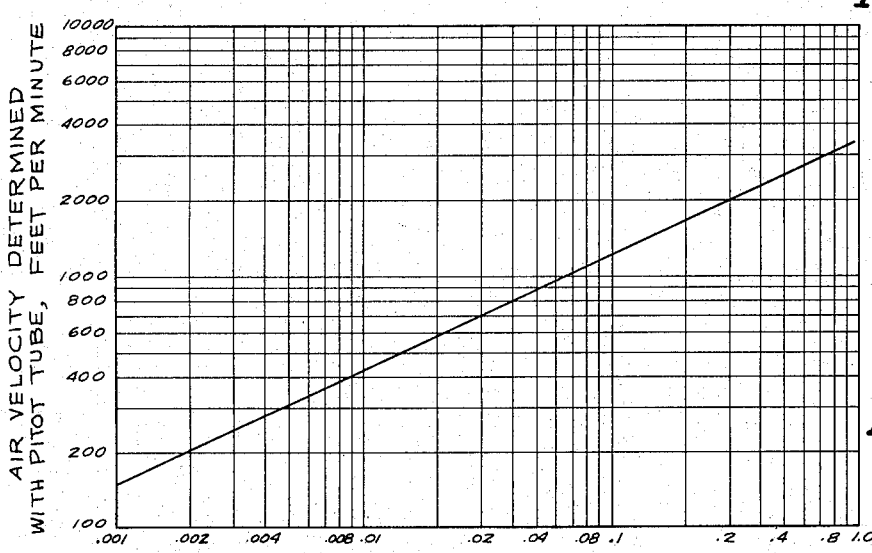
INVENTOR.
BRUCE R. WALSH

United States Patent Office 3,359,795
Patented Dec. 26, 1967

3,359,795
WIND VELOCITY INSTRUMENT
Bruce R. Walsh, Pittsburgh, Pa., assignor to Gulf Research & Development Company, Pittsburgh, Pa., a corporation of Delaware
Filed Apr. 29, 1965, Ser. No. 451,707
8 Claims. (Cl. 73—189)

ABSTRACT OF THE DISCLOSURE

A pair of saucer-like discs whose convex surfaces face each other and have support means to maintain them in coaxial spaced-apart relationship. One of the pair of disks has a small central pressure top opening having connection with a device for indicating the reduced pressure caused by the wind blowing between said disks. In one embodiment, a pair of curved plates are disposed between the disks on diametrically opposed sides of the pressure tap opening with the convex surfaces thereof facing each other across the pressure tap opening. Said pair of facing plates is provided with means for rotation as a unit so that the channel therebetween is continually facing into the wind. In a separate embodiment, at least one of the saucer-like disks can be adapted to automatically move in relation to the other upon a change in wind velocity.

---

Figure 1:
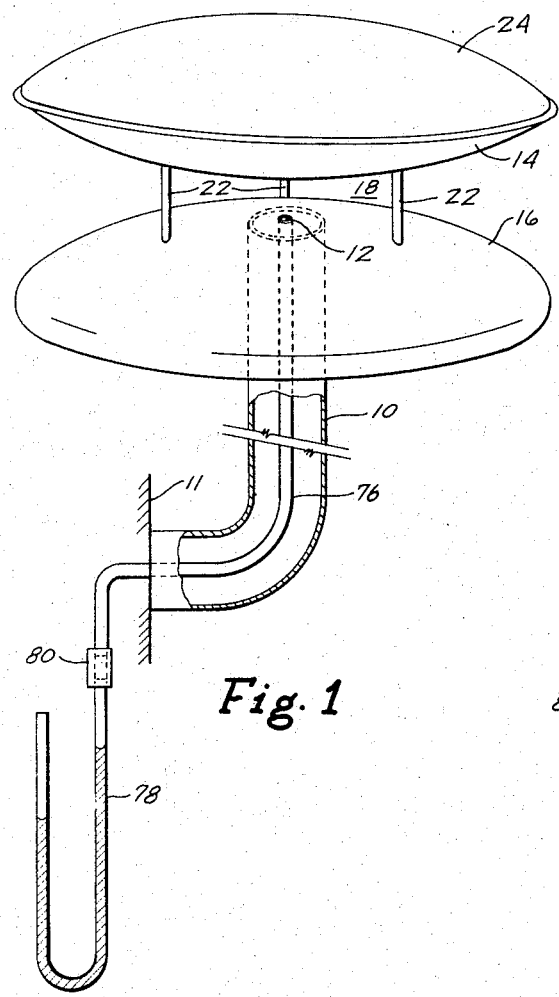

This invention relates to apparatus for measuring the velocity of atmospheric wind, water currents or currents of other fluids whose direction of flow changes periodically, frequently or continuously.

A preferred form of the velocity gauge apparatus of this invention comprises a pair of saucer-like members whose convex surfaces face each other and have support means to maintain them in coaxial spaced-apart relationship. The saucer-like members are advantageously disk-shaped. One of the pair of facing disks has a small central pressure tap opening having connection with a device for indicating pressure, differential pressure, or vacuum. The apparatus is adapted for horizontal disposition of the disks at an exposed, unprotected position in the atmosphere or below the surface of a body of water having currents whose direction of flow is changeable. The convex facing disks define a circular venturi-like throat which is open along a 360 degree arc to accept ambient air currents or water currents from any direction. The apparatus is therefore immune to changes in direction of approach of the fluid whose velocity is being measured and is installed in a locale which is exposed to atmospheric air currents or water currents approaching from all directions.

The circular venturi-like throat restriction is defined in the space between the central regions of the convex facing disks, which is the region of narrowest separation between the facing disks. The velocity of air or water movement in the space between the disks is a minimum at the periphery of the disks and is a maximum at the venturi throat restriction at the center of the disks, whereby a region of reduced pressure is induced at the center of the disks. The ratio of the distance between the disks at the centers thereof and the distance between corresponding points on the rims of the disks can vary widely but is advantageously between about 1:1.5 and 1:6 in order to produce a sufficient pressure reduction at the center of the disks for the purposes of this invention. Either the upper disk or the lower disk has a small pressure tap opening in connection with a draft measuring device and the draft at the venturi throat indicates the velocity of the fluid flowing therethrough.

The velocity measuring gauge apparatus can include means for adjusting the distance between the facing convex disks to insure that the size of the venturi defined by the disks induces a substantial pressure reduction at the prevailing velocity level. At any particular velocity level of air relative to the apparatus, one particular venturi size defined by the facing convex disks may provided the most advantageous pressure reduction for determining air velocity while at another velocity level another particular venturi size defined by the facing convex disks may provide a more advantageous pressure reduction for establishing air velocity. The means for adjusting the distance between the disks permits establishment of the most advantageous pressure reduction for determination of flow rate at any particular velocity level.

In a modified embodiment of the apparatus of this invention, the spacing between the facing convex disks is automatically and continuously adjustable in response to variation in the velocity of ambient air relative to the disks. In this embodiment the surfaces of the facing convex disks are free of any pressure tap opening because the draft at the venturi throat is not measured. One or both of the disks can be adapted to automatically move in relation to the other upon an increase in wind velocity and the direction of movement of a moveable disk upon an increase in wind velocity can be toward or away from the other disk. The extent of movement of the disks toward or away from each other upon a change in wind velocity can be calibrated to indicate the velocity of the wind. Therefore, in this embodiment measurement of lineal movement is substituted for measurement of draft.

The direction and extent of automatic movement of a moveable disk upon a given change in wind velocity is established by the degree of curvature of the surface covering the concave interior of the moveable disk. For example, if the surface covering the concave interior of a moveable disk is substantially flat, the velocity of the wind over said surface will not result in a marked reduction in pressure along said surface so that the negative pressure produced at the venturi-like throat between the two facing convex venturi-defining disks will establish a force causing the moveable disk to move toward its facing convex disk. On the other hand, if the surface covering the concave side of a moveable disk possesses a substantial degree of curvature so that its radius of curvature is less than the radius of curvature of the venturi-defining surface which it encloses, the velocity of the wind over said surface results in a marked reduction in pressure thereat which can be even more pronounced than the reduced pressure in the region of the venturi, whereby a net force is produced causing the moveable disk to move away from its facing convex disk.

In a modification of the form of the apparatus of this invention wherein air velocity is determined by measuring pressure reduction, a venturi tube having two open ends is provided with a small lateral pressure tap opening at the throat thereof. The pressure tap opening has connection with a pressure measuring device. The venturi tube is rotatably mounted to permit rotation of the venturi tube about the axis of said pressure tap. The venturi tube has an attached rudder projecting therefrom so that the action of atmospheric wind currents against the rudder rotates the venturi tube on its rotatable mounting, causing the inlet end of said venturi tube to continuously face into the wind. In this manner, the venturi tube continuously faces into the wind and the apparatus is immune to changeability in wind direction.

A further embodiment of this invention utilizes rotatable venturi passageway means disposed within a pair of stationary disks having facing convex surfaces. In this embodiment the venturi passageway is rotatable to continuously face into the wind but the stationary disk portion of the structure, even though it defines in part the venturi passageway, is fixed in a stationary position. The structure which experiences rotation constitutes only a portion of the total weight of the venturi conduit and is therefore more responsive to the rotative power of the wind than is a venturi apparatus in which the entire structure defining the venturi conduit is rotated. This embodiment comprises a pair of saucer-like disks whose convex surfaces face each other and have support means to maintain them in coaxial spaced-apart relationship. One of the facing disks has a small central pressure tap opening. A pair of curved plates is disposed between the facing disks on diametrically opposed sides of the small pressure tap opening with the convex surfaces of said plates facing each other across the pressure tap opening. Each of the plates is contoured longitudinally to correspond to but be slightly spaced apart from the contiguous surface of the disks to define a venturi channel bounded on two lateral sides by said plates and bounded from above and below by the facing disks, with the pressure tap opening disposed at the throat of the venturi channel. Rudder means is attached to the pair of curved plates and projects beyond an end of the plates. The apparatus is provided with rotatable mounting means to permit the pair of curved plates to revolve around the axis of the pressure tap opening while the facing disks remain stationary. Means is also provided to maintain the plates in a fixedly spaced-apart relationship with respect to each other so that they revolve as a unit. The apparatus is adapted so that the action of the wind against the rudder causes the venturi channel to rotate so that said channel is continuously facing into the wind, even though the facing disks which define a portion of the channel are not rotatable. No matter what the direction of the wind may be, the venturi throat is defined in the space between the central regions of the stationary convex facing disks, which is the region of narrowest separation between the facing disks. The velocity of air movement in the venturi channel is always at a maximum at the venturi throat restriction, which is substantially midway between the inlet and outlet openings, whereby a region of reduced pressure is induced at the venturi throat. The pressure reduction at the venturi throat is measured and the air velocity is determined by said measurement.

Figure 2:
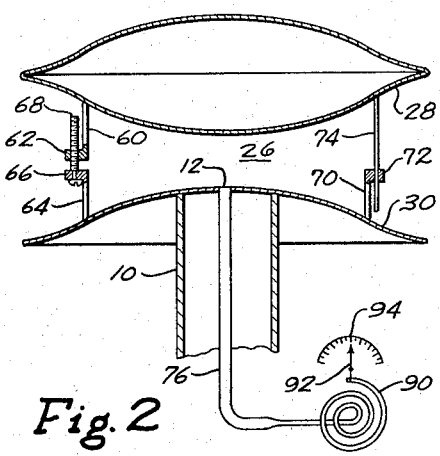
Figure 3:
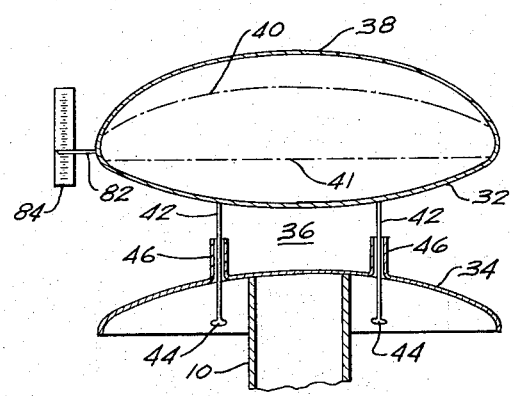
Figure 4:
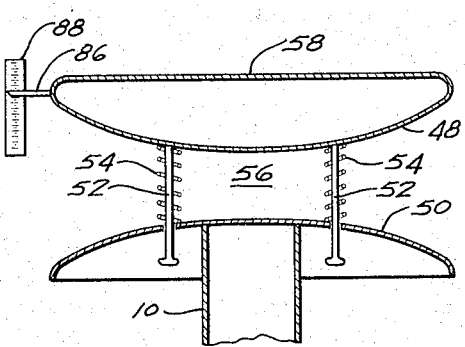
Figure 5:
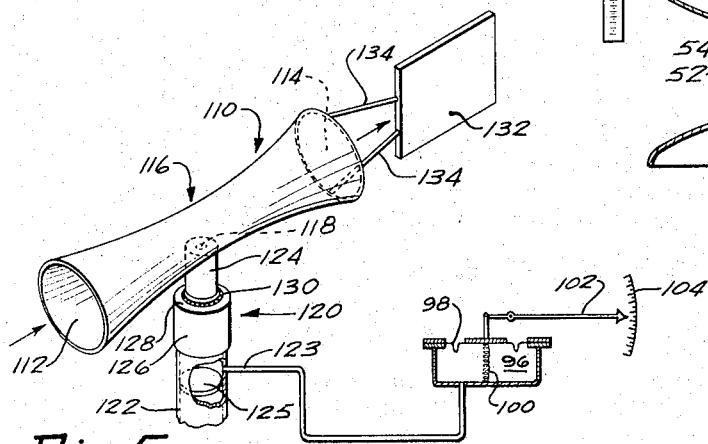

The velocity measuring apparatus of this invention will be better understood by reference to the drawings in which FIGURE 1 is a perspective view of an embodiment of the velocity measuring apparatus of this invention wherein velocity is determined by measurement of pressure, FIGURE 2 is a sectional view of a modification of the apparatus of FIGURE 1, FIGURE 3 is a sectional view of a velocity measuring apparatus wherein velocity is determined by measuring the extent of upward movement of an upper disk upon increasing wind velocity, FIGURE 4 is a sectional view of a velocity measuring apparatus wherein velocity is determined by measuring the extent of downward movement of an upper disk upon increasing wind velocity, FIGURE 5 is a perspective view of a rotatable tubular venturi conduit velocity measuring apparatus of this invention, FIGURE 6 is a perspective view of a rotatable venturi conduit velocity measuring apparatus in which a portion of the surface defining the venturi conduit is stationary, FIGURE 7 is a top view of the apparatus of FIGURE 6, FIGURE 8 is a view taken through the section 8—8 of FIGURE 6, FIGURE 9 is a view taken through the section 9—9 of FIGURE 7, and FIGURE 10 is a graph illustrating the correlation between induced draft and air velocity with the apparatus of FIGURE 1.

In FIGURES 1 through 4 tube 10 supports the velocity measuring apparatus in a position where it is exposed to air currents approaching from any direction. Supporting tube 10 emanate from any source 11, such as a building.

Referring to FIGURE 1, a pair of coaxial disks 14 and 16 have convex surfaces which face each other to define a circular venturi-like throat 18 in the region between the centers thereof. Convex disks 14 and 16 have substantially the same diameter and the same radius of curvature. The lower disk 16 has a central small pressure tap opening 12 which is only slightly larger than the outside diameter of pipe 76 at opening 12 so that the discharge end of pipe 76 is snugly received by opening 12. The discharge end of pipe 76 is flush or level with the surface of disk 16 so that the discharge end of pipe 76 shares a common surface with disk 16 and does not extend above the convex surface of disk 16. Pipe 76 extends to manometer 78 and is secured tightly thereto by means of a rubber coupling tube 80.

Convex disks 14 and 16 are maintained at a fixed distance apart from each other by means of supporting rods 22. The concave interior of upper disk 14 is enclosed by a surface 24 which can be a disk having substantially the same radius of curvature as disk 14.

Air movement relative to the apparatus of FIGURE 1 causes air to flow into the space between convex disks 14 and 16. The velocity of the air begins to increase in the region of the periphery or outer rim of disks 14 and 16 and reaches a maximum at circular venturi-like throat 18. The high air velocity at venturi-like throat 18 creates a reduced pressure which is indicated at manometer 78 and which is directly correlated with ambient wind velocity.

Tests were conducted utilizing the apparatus of FIGURE 1 to measure air velocity. In the test apparatus the radius of curvature of each of the disks 14, 16 and 24 shown in FIGURE 1 was 5¾ inches and the diameter of the outer rim of each disk was six inches. The spacing between the disks was such that the distance between corresponding points on the upper and lower outer rim was three times the distance between the disks at the venturi throat, to provide a venturi throat to venturi inlet ratio of 1:3. A ¼ inch pressure tap opening and tube was provided at the center of the bottom disk and was connected to a manometer. The apparatus was disposed horizontally in a wind tunnel and air was blown through the tunnel. The manometer measurements obtained with the apparatus of this invention were plotted against air velocity values obtained by measuring static pressure with a Pitot-static tube and calculating air velocity by means of the equation $p=\frac{1}{2}\rho v^2$, wherein $p$ is the Pitot-static tube pressure measured, $\rho$ is air density as calculated on the basis of temperature and barometric pressure measurements, and $v$ is the calculated air velocity. The pressure reduction measurements obtained with the apparatus of this invention correlated with the velocity obtained with the Pitot-static tube in a straight line relationship in a log-log graph. The correlation is shown in FIGURE 10. Additional data were obtained after modifying the same apparatus by moving the disks closer to each other so that the distance between corresponding points on the upper and lower outer rims was four times the distance between the disks at the venturi throat to provide a venturi throat to venturi inlet ratio of 1:4. Higher pressure reduction readings were obtained with the new ratio, but the graph of these data paralleled the curve of FIGURE 10 which was obtained with the apparatus at the 1:3 venturi ratio.

FIGURE 2 is a sectional view of an air velocity measuring apparatus in which the venturi-like throat 26 is defined by substantially identical disks 28 and 30 which are not uniformly convex from the center to the periphery thereof. The facing surfaces of disks 28 and 30 are convex in the central regions thereof but tend to become concave in the peripheral regions so that in sectional view the apparatus resembles a pipeline venturi tube.

FIGURE 2 illustrates manual means for adjusting the size of venturi-like throat 26 in order to obtain the most advantageous draft effect for a particular wind velocity level. A rod 60 depends from disk 28. Rod 60 is provided with a terminal bracket 62 having a threaded opening extending therethrough. Complementary rod 64 rises from disk 30. Rod 64 is provided with a terminal bracket 66 having a nonthreaded opening extending therethrough. Screw 68 extends through brackets 66 and 62, but is in threaded engagement with bracket 62 only. A dowel 74 also depends from disk 28. Complementary rod 70 rises from disk 30. Rod 70 is provided with a terminal bracket 72 having an opening extending therethrough which is slightly larger than dowel 74 so that it slidably receives dowel 74. Upon rotation of screw 68 dowel 74 and bracket 72 prevent rotation of disk 28 and permit disk 28 to move axially relative to disk 30 whereby adjustment of the size of venturi 26 is accomplished. In the apparatus of FIGURE 2, the draft at venturi-like throat 26 is transmitted to a flexible helix 90 through pressure tap opening 12 and pipe 76. The extent of coiling or uncoiling of helix 90 due to changes in draft at venturi-like throat 26 is indicated by pointer 92 moving along scale 94.

The air velocity measuring apparatus of FIGURE 3 utilizes the draft effect between facing convex disks to determine ambient wind velocity without measuring said draft. The apparatus of FIGURE 3 is adapted so that upper disk 32 is automatically moveable away from lower disk 34 with increasing wind velocity and is gravity biased with respect to the lower disk at all times. Facing convex disks 32 and 34 define a venturi-like throat 36 in the region of smallest separation between said disks. Enclosure disk 38 covers the concave side of convex venturi-defining disk 32. Enclosure disk 38 has a smaller radius of curvature than the radius of curvature of venturi-defining disk 32. For purposes of comparison, line 40 defines the position of an imaginary enclosure disk surface having the same radius of curvature as disk 32.

Rods 42 each terminate with a lower knob 44 and depend from upper convex disk 32 while pipes 46 which are open at both ends extend upwardly from openings in lower convex disk 34. Each rod 42 extends through its associated pipe 46 and is freely moveable upwardly relative to its associated pipe 46 until knobs 44 reach disk 34. When there is no significant atmospheric movement relative to the apparatus, convex disk 32 rests upon the upper end of pipes 46 and pointer 82 indicates a zero velocity on scale 84. Upon occurrence of a significant air velocity relative to the apparatus, air flowing between convex disks 32 and 34 reaches a maximum velocity at venturi-like throat 36 and creates a reduced pressure thereat. However, because of the high degree of curvature of enclosure disk 38, air movement along enclosure disk 38 concomitantly produces a reduced pressure in the region above encloser disk 38 and, because of the radius of curvature of enclosure disk 38 is smaller than the radius of curvature of convex disk 32, a net upward force is created causing convex disk 32 to move upwardly. As disk 32 moves upwardly pointer 82 indicates a greater air velocity on scale 84. When the wind velocity decreases from a high level, the net lifting force upon upper disk 32 is reduced and disk 32 moves downwardly, causing pointer 82 to indicate a lower air velocity on scale 84.

It is noted that the reduced pressure at venturi-like throat 36 opposes the reduced pressure above enclosure disk 38. Therefore, the venturi-like throat 36 in FIGURE 3 can be dispensed with by converting either or both convex disks 32 and 34 into flat surfaces whereupon the motive force due to the reduced pressure above enclosure disk 38 will not be diminished by a counteracting force due to a reduced pressure zone at venturi region 36. For example, the convex surface of disk 32 can be replaced by a flat surface as indicated by dashed line 41, whereupon convex member 34 no longer defines a venturi-like throat but is simply a support member.

The apparatus of FIGURE 4 is adapted so that convex disk 48 automaticaly moves closer to lower facing convex disk 50 upon increasing wind velocity whereby the effect of wind velocity in the apparatus of FIGURE 4 is directly opposite to the wind velocity effect in the apparatus of FIGURE 3. Rods 52 depend from upper convex disk 48 and extend through associated openings in lower facing convex disk 50. Rods 52 extend longitudinally through springs 54 which are disposed entirely between facing convex disks 48 and 50 to establish the size of venturi-like throat 56 during a no-wind condition. At a no-wind condition pointer 86 indicates a zero reading on scale 88. Springs 54 are normally in neither substantial tension nor compression. Enclosure disk 58 covers the concave side of upper convex disk 48 and is substantially flat or has a much larger radius of curvature than convex disk 48. When the air is still, upper convex disk 48 is supported by springs 54. Upon increasing wind velocity, a reduced pressure is created between facing convex disks 48 and 50. Since enclosure disk 58 is flat and substantially free of curvature, air movement along enclosure disk 58 does not induce a significant pressure reduction along enclosure disk 58. The reduction in pressure between facing convex disks 48 and 50 therefore creates a net force tending to depress upper convex disk 48 against springs 54 and reduce the size of venturi throat 56, causing pointer 86 to ride downwardly on scale 88 to indicate increasing wind velocity. When wind velocity subsequently diminishes, a lower reduced pressure ensues between facing convex disks 48 and 50 and the compressive stress in springs 54 tends to lift upper convex disk 48, causing pointer 86 to ride upwardly on scale 88.

FIGURE 5 shows a venturi conduit tube 110 having an air inlet opening 112, an air discharge opening 114, and a venturi throat region 116. Small lateral pressure tap opening 118 is positioned at the throat of the venturi. A support assembly 120 depends from lateral opening 118 to tightly enclose the top of support pipe 122 and provide a vacuum seal.

Support assembly 120 is comprised of a pipe 124 depending from lateral pressure tap opening 118 from which in turn depends a pipe 126 which snugly encloses the top of support pipe 122. Pipes 124 and 126 are joined by a flange 128 in which is embedded a rotatable bearing 130. Although bearing 130 is shown in the drawings to be a ball bearing, any other common type of bearing can be employed such as a rolller bearing, a needle bearing, or a journal bearing. The inner race of the ball bearing is fixedly secured to the rotating portion of the apparatus which includes venturi tube 110 and pipe 124 depending therefrom, while the outer race of the ball bearing is fixedly secured to non-rotating tube 126 which tightly encloses the top of support pipe 122. A rudder 132 supported by rods 134 is disposed on the vertical plane containing an extension of the axis of venturi tube 110 and is supported in a position substantially beyond air discharge opening 114 of the venturi tube.

During operation of the apparatus of FIGURE 5, when atmospheric wind produces a net force laterally against one side of rudder 132, a torque is created which tends to rotate the entire venturi tube 110 relative to the outer stationary race of ball bearing 130. Rotation continues until the flat surfaces of rudder 132 are entirely parallel to wind direction, at which time no further torque is exerted and air inlet opening 112 faces directly into the wind, as is indicated by the wind directional arrow of FIGURE 5. Upon a change in wind direction, the wind again produces a net lateral force against one side of rudder 132, again producing a torque which rotates the venturi until air inlet opening 112 once more faces directly into the wind. In this manner, air inlet opening 112 is either facing into the wind or being rotated to face directly into the wind at all times.

Plug 125 seals support pipe 122 and the draft induced at venturi throat region 116 is transmitted substantially undiminished to a measuring device through pipe 123. The measuring device comprises a vacuum chamber 96 enclosed by a flexible diaphragm 98. Increasing vacuum at venturi throat region 116 causes diaphragm 98 to move downwardly against the action of spring 100 which is under compression. Decreasing vacuum permits spring 100 to urge diaphragm 98 upwardly. Upward and downward movement of diaphragm 98 is reflected by movement of pointer 102 along scale 104.

Referring to FIGURE 6, a pair of coaxial disks 156 and 158 have convex surfaces which face each other to form a venturi-like throat in the region between the centers thereof. Convex disks 156 and 158 each have substantially the same diameter and the same radius of curvature. The lower disk 156 has a central small lateral pressure tap opening 160 which is only slightly larger than the outside diameter of pipe 106 so that the discharge end of pipe 106 is snugly received by opening 160. The discharge end of pipe 106 is flush or level with opening 160 so that the discharge end of pipe 106 shares a common surface with lower disk 156 and does not extend above the convex surface of lower disk 156. Pipe 106 travels through a support pipe 162 which originates from a source 164, which can be the wall of a building. Convex disks 156 and 158 are maintained at a fixed distance apart from each other by means of supporting rods 166. The concave interior of upper disk 158 is enclosed by a surface 168.

A pair of curved plates 170 is disposed between the facing convex disks 156 and 158 on diametrically opposite sides of central opening 160. The curvature of plates 170 is clearly shown in FIGURE 7. The convex surfaces of the pair of plates 170 face each other across small central pressure tap opening 160. Each plate 170 is contoured longitudinally to correspond to the contiguous surfaces of disks 156 and 158 to define a rectangular venturi channel 172 bounded on two lateral sides by plates 170 and bounded from below and above by disks 156 and 158, respectively. However, each plate 170 is slightly spaced apart from disks 156 and 158, as is clearly shown in FIGURE 8. Small central pressure tap opening 160 is disposed in the region of the throat of venturi channel 172. At the center of the lower edge of each plate 170 is a bracket 174 which is secured to the upper race of ball bearing 176, as is clearly shown in FIGURE 9, and which is adapted to travel with the upper race of ball bearing 176. Tie rod 178 is attached at its opposite ends to each convex plate 170 to secure plates 170 in a fixedly spaced-apart relationship and to insure that said plates move as a unit on ball bearing 176. Thereby the pair of plates 170 do not move relative to each other on the ball bearing. Rudder 180 is disposed outside the edges of disks 156 and 158 on a vertical plane containing an extension of the longitudinal axis of venturi channel 172 and is secured to tie rod 178 by means of rod 182.

A net lateral force exerted by the wind against one side of rudder 180 produces a torque which tends to revolve the pair of convex plates 170 as a unit with the upper race of ball bearing 176 around central pressure tap opening 160. Plates 170 move along the surfaces of stationary disks 156 and 158, but plates 170 do not move relatives to each other. Movement of plates 170 continues until the flat surfaces of rudder 180 are entirely parallel to the prevailing wind direction, at which time no further torque is exerted and the air inlet opening of venturi channel 172 faces directly into the wind, as indicated by the wind directional arrow in FIGURE 6. Upon a change in wind direction, the wind again produces a net lateral force against one side of rudder 180, again producing a torque which rotates venturi channel 172 until the air inlet opening thereof once more faces directly into the wind. In this manner, the air inlet opening of venturi channel 172 is continuously either facing directly into the wind or is being rotated to face directly into the wind. It is seen that the venturi channel of the apparatus of FIGURE 6 can be automatically and continuously rotated to direct the air opening thereof into the wind while only a portion of the structure defining the venturi channel actually rotates. This provides the advantage of reducing the total weight which must be moved by the torque exerted against rudder 180, whereby the apparatus is highly sensitive to very slight winds and to very small changes in wind velocity and direction.

The vacuum induced at the throat of venturi channel 172 is transmitted to manometer 108 through pipe 106. Pipe 106 is tightly coupled to one end of manometer 108 by means of rubber tubing 109. The other end of the manometer can be open to the atmosphere. The difference in height of the liquid in the two legs of the manometer is an indication of the vacuum induced at the throat of venturi channel 172.

Various changes and modifications can be made without departing from the spirit of this invention or the scope thereof as defined in the following claims.

I claim:

1. Velocity measuring apparatus comprising a pair of convex members, support means for maintaining said members in spaced-apart relationship with the convex surfaces facing each other, the convex central regions of said members facing each other in spaced-apart relationship to form a circular venturi-like throat therebetween, one of said members being gravity biased toward the other of said members at all times, said support means adapted to permit movement of said members relative to each other upon changes in velocity of a fluid flowing across said apparatus, and measuring means for measuring the extent of movement of said members relative to each other.

2. Velocity measuring apparatus comprising a pair of convex disks, support means for maintaining said disks in spaced-apart relationship with the convex surfaces facing each other, the convex central regions of said disks facing each other in spaced-apart relationship to form a venturi-like throat therebetween, one of said members being gravity biased toward the other of said members at all times, said support means adapted so that one of said disks is moveable relative to the other upon changes in velocity of a fluid flowing across said apparatus, said moveable disk having an enclosure surface for enclosing the concave side thereof, and measuring means for measuring the extent of movement of said moveable disk.

3. The apparatus of claim 2 wherein said enclosure surface is substantially flat.

4. The apparatus of claim 2 wherein the radius of curvature of said enclosure surface is less than the radius of curvature of said concave side.

5. The apparatus of claim 2 wherein the radius of curvature of said enclosure surface is greater than the radius of curvature of said concave side.

6. Velocity measuring apparatus comprising a pair of saucer-like disks whose convex surfaces face each other, first support means adapted to support said disks in coaxial spaced-apart relationship, central pressure tap opening means in one of said facing disks, a pair of curved plates disposed between said disks on diametrically opposed sides of said central pressure tap opening means with the convex surfaces of said plates facing each other across said central pressure tap opening means, each of said plates contoured longitudinally to correspond to but be slightly spaced apart from the contiguous surfaces of said disks to define a venturi channel bounded on two lateral sides by said pair of plates and bounded from above and below by said disks with said central pressure tap opening disposed at the throat of said venturi channel, second support means for securing said plates in fixed spaced-apart relationship, rudder means attached to said plates and projecting beyond an end of said plates, rotatable means, said plates mounted on said rotatable means, and pressure measuring means having connection with said pressure tap opening means for measuring the pressure thereat.

7. The apparatus of claim 6 wherein said rotatable means comprises a bearing.

8. The apparatus of claim 6 wherein said rudder means is supported beyond the downstream end of said venturi channel on the vertical plane which contains an extension of the axis of said venturi channel.

References Cited
UNITED STATES PATENTS

| | | | |
|---|---|---|---|
| 2,630,711 | 3/1953 | Kahl | 73—189 |
| 1,911,169 | 5/1933 | Trogner | 73—189 |
| 2,633,746 | 4/1953 | Miller | 73—189 |
| 2,919,577 | 1/1960 | Cone | 73—189 X |
| 3,055,216 | 9/1962 | Wappner | 73—189 X |
| 3,130,586 | 4/1964 | Taylor et al. | 73—406 |

FOREIGN PATENTS

| | | |
|---|---|---|
| 872,013 | 7/1961 | Great Britain. |

RICHARD C. QUEISSER, *Primary Examiner.*

JAMES GILL, *Examiner.*

J. J. SMITH, JERRY W. MYRACLE,
*Assistant Examiners.*